US005123435A

United States Patent [19]

Blacklin et al.

[11] Patent Number: 5,123,435

[45] Date of Patent: Jun. 23, 1992

[54] LAMINAR DAMPER AND METHOD OF AIRFLOW CONTROL

[75] Inventors: Peter A. Blacklin, Columbia; David A. Racine, Baltimore, both of Md.

[73] Assignee: Tate Access Floors, Inc., Jessup, Md.

[21] Appl. No.: 675,879

[22] Filed: Mar. 27, 1991

[51] Int. Cl.[5] .................... F16K 7/02

[52] U.S. Cl. .................... 137/1; 137/601

[58] Field of Search .................... 137/601, 599, 1

[56] References Cited

U.S. PATENT DOCUMENTS

| | | | |
|---|---|---|---|
| 2,672,088 | 3/1954 | Orr | 137/601 |
| 2,884,005 | 4/1959 | Honerkamp et al. | 137/601 |
| 3,011,518 | 12/1961 | Day et al. | 137/601 |
| 3,034,531 | 5/1962 | Kennedy | 137/601 |
| 3,593,645 | 7/1971 | Day | 137/599 X |
| 4,457,336 | 7/1984 | Allan et al. | 137/601 |
| 4,535,811 | 8/1985 | Wood et al. | 137/601 |

FOREIGN PATENT DOCUMENTS 1543930 4/1979 United Kingdom .

*Primary Examiner*—Stephen M. Hepperle
*Attorney, Agent, or Firm*—Oblon, Spivak, McClelland, Maier & Neustadt

[57] ABSTRACT

A method and apparatus of controlling the flow of a fluid is disclosed which includes a frame having first and second opposite sides, a plurality of flexible hollow tubular shaped elements positioned so as to extend between the first and second sides of the frame, and a mechanism connected to at least the first side of the frame for compressing opposite lateral edges of the first and second sheets of the flexible elements towards and away from one another so as to flex the first and second sheets of each of the flexible elements towards and away from each other and thus adjust fluid flow spacings between neighboring flexible elements. The method of controlling the flow of the gas includes the step of flowing the fluid between neighboring hollow tubular elements and biasing the first and second splines towards one another so as to flex the sheets of the tubular elements away from one another and towards neighboring tubular elements so as to adjust the opening between the neighboring tubular elements.

11 Claims, 10 Drawing Sheets

LAMINAR DAMPER AND METHOD OF AIRFLOW CONTROL

BACKGROUND OF THE INVENTION

1. Field of the Invention

This invention relates to a laminar damper and method for controlling the flow of air or any other gas or fluid at low differential pressures.

2. Discussion of the Background

The state of the art dampers fall into three general categories, these being: sliding dampers (FIGS. 6A, 6B), opposed blade dampers (FIGS. 7A, 7B) and louvered dampers (FIG. 8). The sliding blade dampers function by using two plates with perforations that are slid across one another to control the flow through the holes. These dampers at the fully open position block at least 50% of the opening and create accelerated flow through sharp edged openings, which thus create turbulence in the downstream flow. This results in the flow velocity profile shown in FIG. 6B. The opposed blade dampers consist of plates arranged on spindles so that the plates can rotate, each plate rotating in the opposite direction to that of its neighbor. This type of damper does not restrict the flow through the opening in the fully open position and when the damper is closed the edges of the plates touch. In the partially open condition the blades force the flow into convergent and divergent streams as shown in FIG. 7A, thus creating a nonuniform velocity profile as shown in FIG. 7B and turbulence across the controlled flow. The louvered dampers are similar to the opposed blade dampers except that the blades rotate in the same direction as shown in FIG. 8. In partially open conditions, the flow is diverted by the blades and exits from the damper at a varying angle depending upon the control setting. Low flow rates create turbulence due to the separation of the airflow around the blade.

SUMMARY OF THE INVENTION

The object of the laminar damper of the present invention is to provide a flow control apparatus and method for a gas which does not have the drawbacks discussed above with respect to the prior art.

The control mechanism of the present invention is generally referred to as a "damper" insofar as its function is to reduce (dampen) the flow of air or any other gas or fluid through one or more openings. Here the term "fluid" is intended to be broadly interpreted and even includes items such as powders or grains.

The laminar damper of the present invention is able to provide control of the airflow from an unrestricted position to a fully closed position and to do so without creating any significant turbulence, flow velocity differentials or a directional change in the downstream controlled air flow. The laminar damper achieves this control by using a plurality of controllable flexible elements. The flexible elements are constructed so as to have substantially parallel splines on opposite lateral edges to provide the elements with mechanical stability. The sheets on either side of the elements flex outwardly so as to provide a smooth contour for controlling the flow of air past each element without any significant turbulence. Control of the flow is accomplished by compressing the elements with the splines so that the lateral sides bow outwardly towards a neighboring flexible element (which may also be being controlled) and thus restrict the flow of gas. The smooth contour does not promote turbulence insofar as the flow is accelerated through the control gap and then expanded uniformly without changing direction. The adjustment mechanism and the geometrical arrangement of the controlling elements further provide a near linear flow control relationship between the adjustment action and the flow. This differs from the flow control relationship of the prior art devices. Variations in the adjustment arrangement allow the damper to control the flow rate across the opening so that the flow can be adjusted to the user's requirements, this being a feature that has not been possible with the current state of prior art dampers.

In accordance with the present invention a laminar damper and method for airflow control are provided which includes utilizing a frame having first and second opposite sides, at least one of the sides of the frame having a plurality of apertures formed therein; a plurality of flexible tubular shaped elements positioned so as to extend between the first and second sides of the frame; a plurality of spline members respectively connected to opposite lateral edges or ends of the flexible elements; and means connected to at least the first side of the frame for moving the spline members towards and away from one another and for correspondingly moving the opposite lateral edges of the first and second sheets of the flexible elements towards and away from one another so as to flex the first and second sheets of each of the flexible elements towards and away from each other and thus effectively adjust airflow spacings between neighboring flexible elements.

In accordance with the present invention the spline members comprise substantially parallel splines respectively connected to opposite edges of the flexible elements and connected to a mechanism for moving the edges of the first and second sheets towards and away from one another.

A plurality of apertures may be formed in at least one side of the frame within which the control members are movable for flexing of the flexible tubular shaped elements.

For providing maximum laminar flow past the tubular elements, the flexible sheets each include uninterrupted sheets of flexible material extending between opposite lateral ends of the tubular shaped elements.

In a preferred embodiment of the present invention, the means for moving opposite ends of the first and second sheets of the flexible elements includes a guide member movably mounted on the least one side of the frame and contacting an end portion of each of the spline members.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
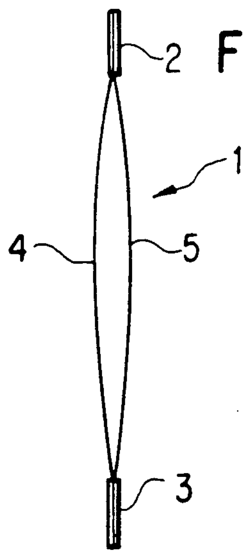
FIG. 1 illustrates the flexible elements and control splines of a tubular shaped element of the laminar damper of the present invention.
Figure 2:
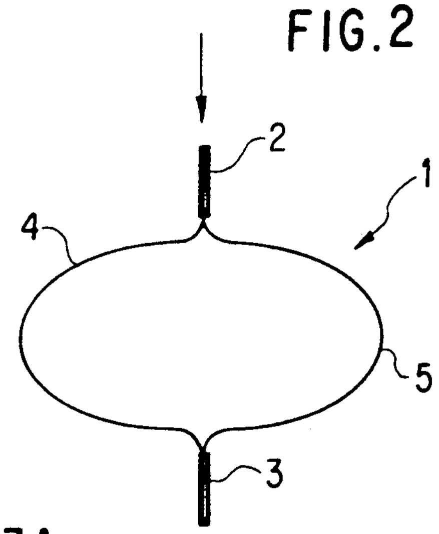
FIG. 2 illustrates the tubular shaped element when in a compressed state.
Figure 3A:
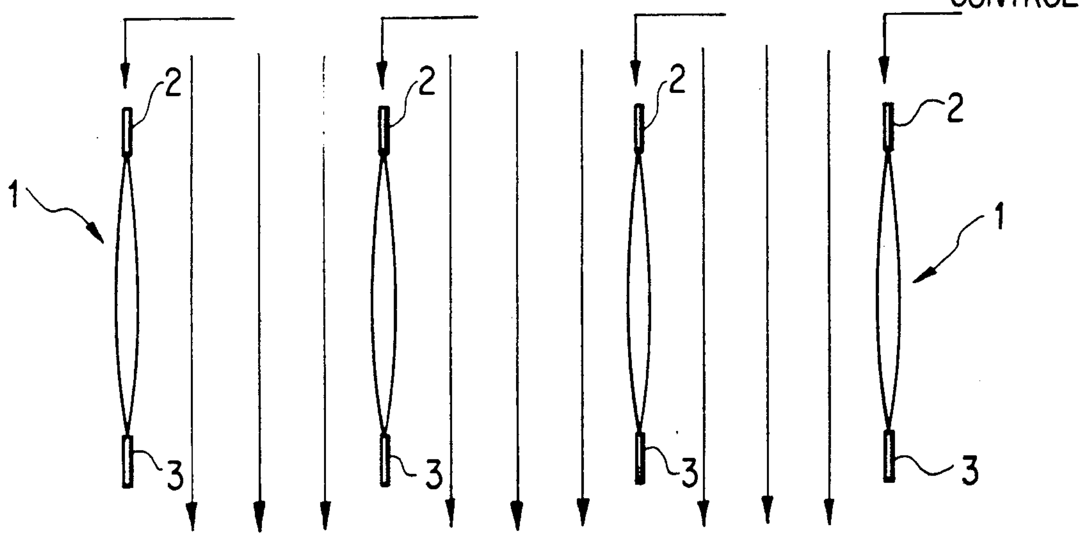
FIGS. 3A and 3B illustrate varying degrees of restriction of flow of air past neighboring laminar damper elements.
Figure 3B:
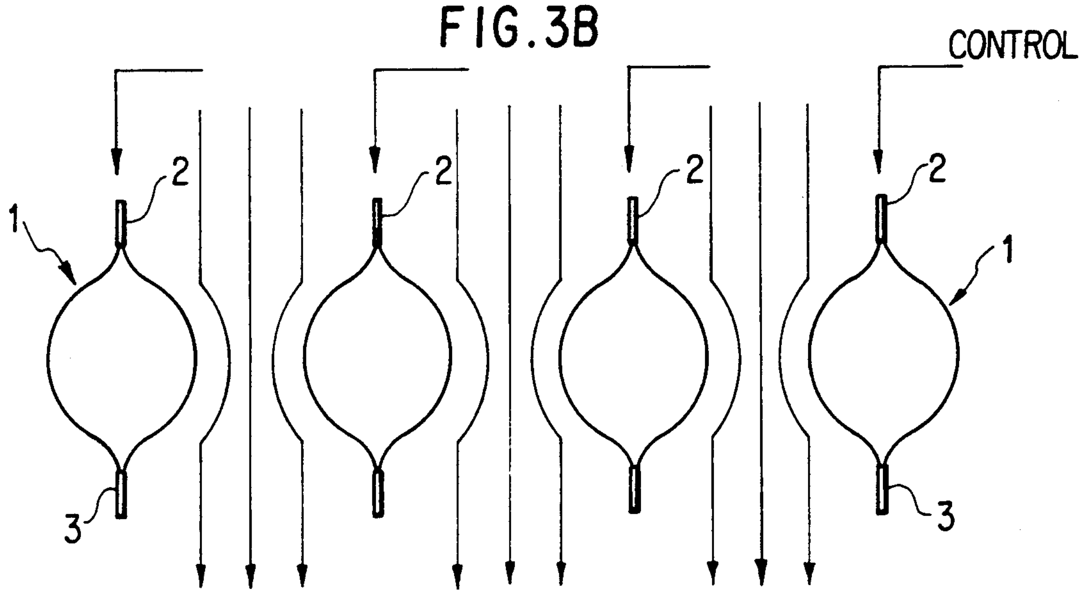

In accordance with the present invention a laminar damper and method of controlling the flow of a gas, typically air, are provided which allows for adjustably controlling the flow of air or any other gas or fluid at low differential pressures, particularly through, for example, floor panels having the laminar damper of the present invention mounted thereon. The laminar damper 1 is able to provide control of the flow of a gas through, for example, a floor panel from an unrestricted to a fully closed position and is able to accomplish this with maximum flexibility of flow. The linear damper achieves this control by using controlling flexible elements 1. These elements are constructed as shown in FIG. 1 and each have substantially parallel longitudinal splines 2, 3 connected to opposite lateral edges of opposed flexible sheets 4, 5 providing the element with mechanical stability. The substantially uninterrupted sheets 4, 5 on either side of elements 1 are able to flex to provide a smooth contour for controlling the flow without turbulence. Control of the flow is accomplished by compressing the elements 1 as illustrated in FIG. 2 so that the sheets 4, 5 bow outward towards a neighboring or adjacent element 1 (which may also be adjusted simultaneously to the same or differing degree) and thus restricts flow as illustrated in FIGS. 3A and 3B.

Figure 4:
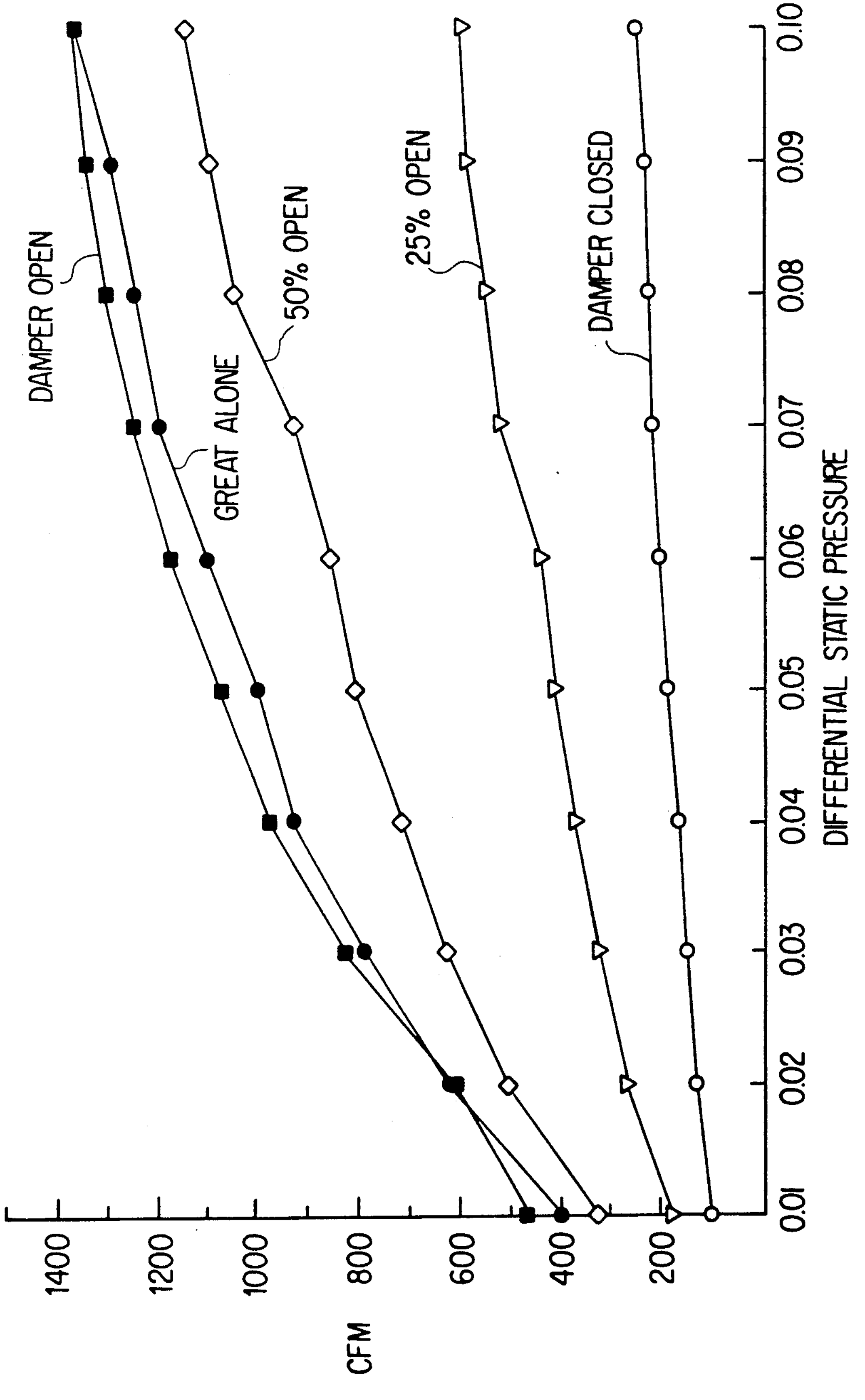
FIG. 4 illustrates the air flow characteristics as measured in lab testing.

FIG. 4 illustrates the air flow characteristics of the present invention as measured in lab testing.

Figure 5A:
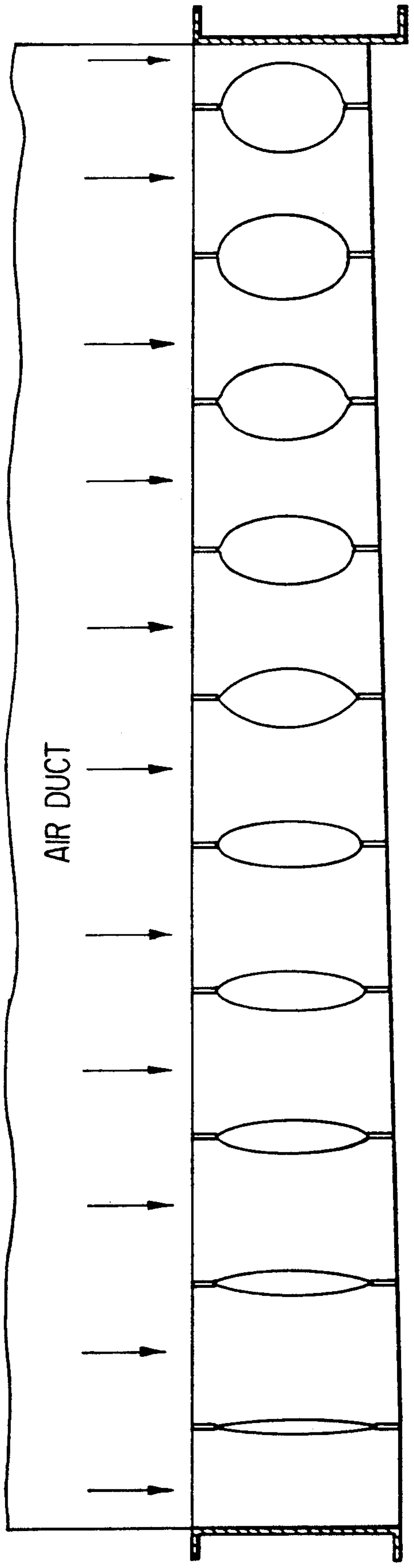
FIGS. 5A and 5B illustrate adjustment of the flow rate across adjacent openings of the laminar dampers so as to be individually modified to the user's requirements.
Figure 5B:
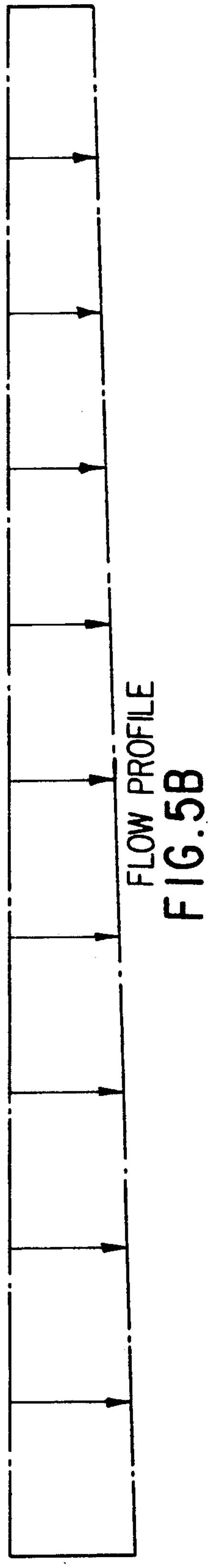
Figure 6A:
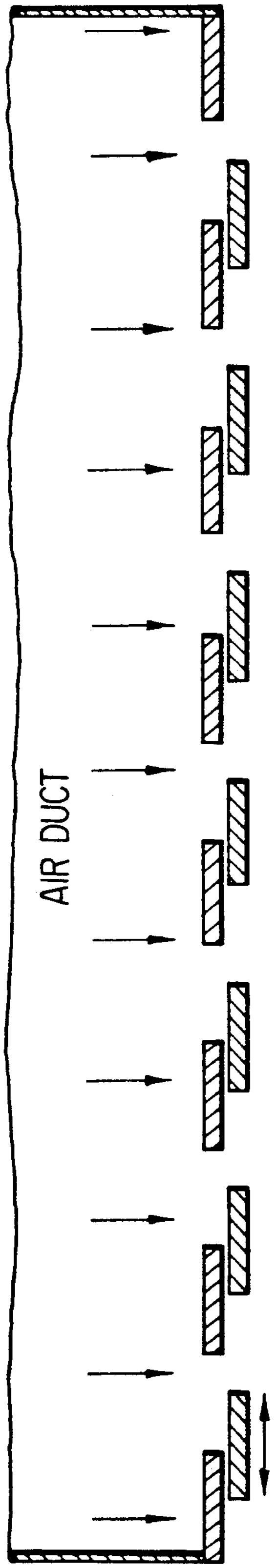
FIG. 6A PRIOR ART
FIGS. 6A and 6B shows conventional sliding dampers and their corresponding velocity profile, respectively.
Figure 6B:
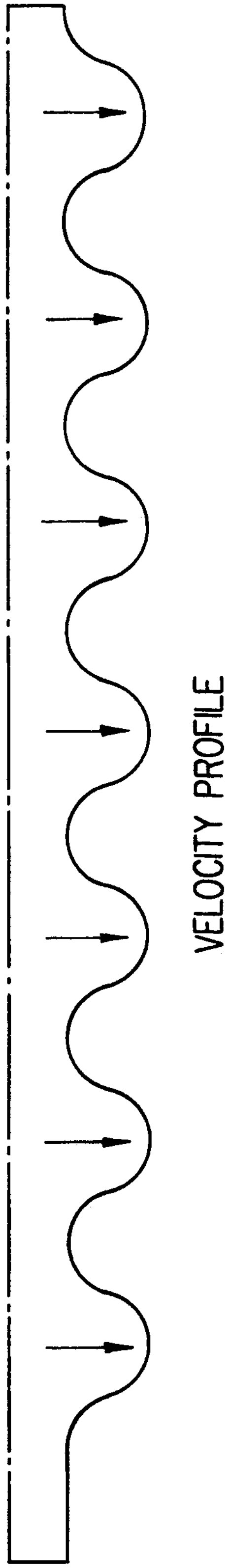
FIG. 6B PRIOR ART
Figure 7A:
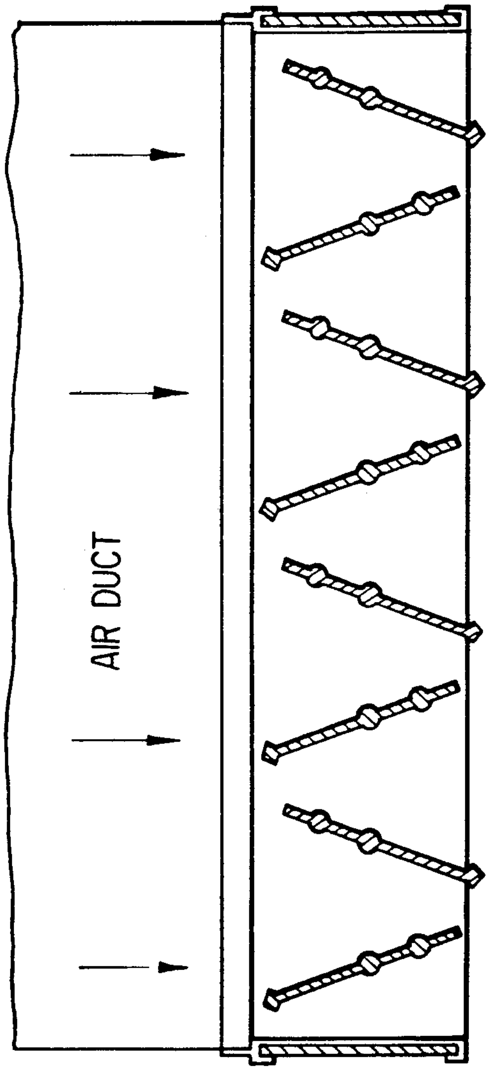
FIG. 7A PRIOR ART
FIGS. 7A and 7B discloses conventional opposed blade dampers and their corresponding velocity profile, respectively.
Figure 7B:
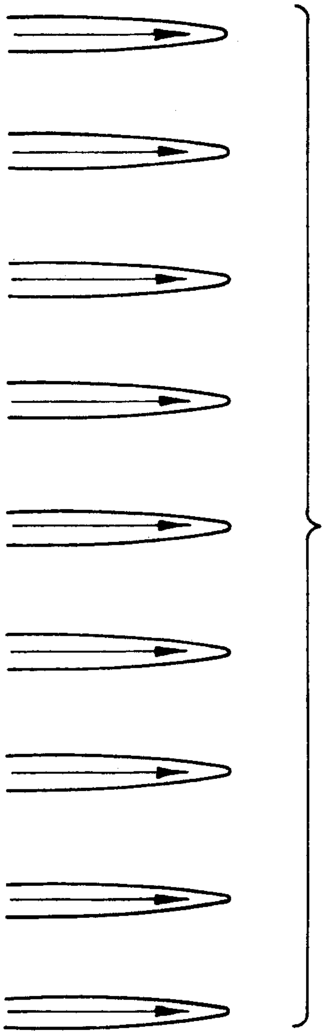
FIG. 7B PRIOR ART
Figure 8:
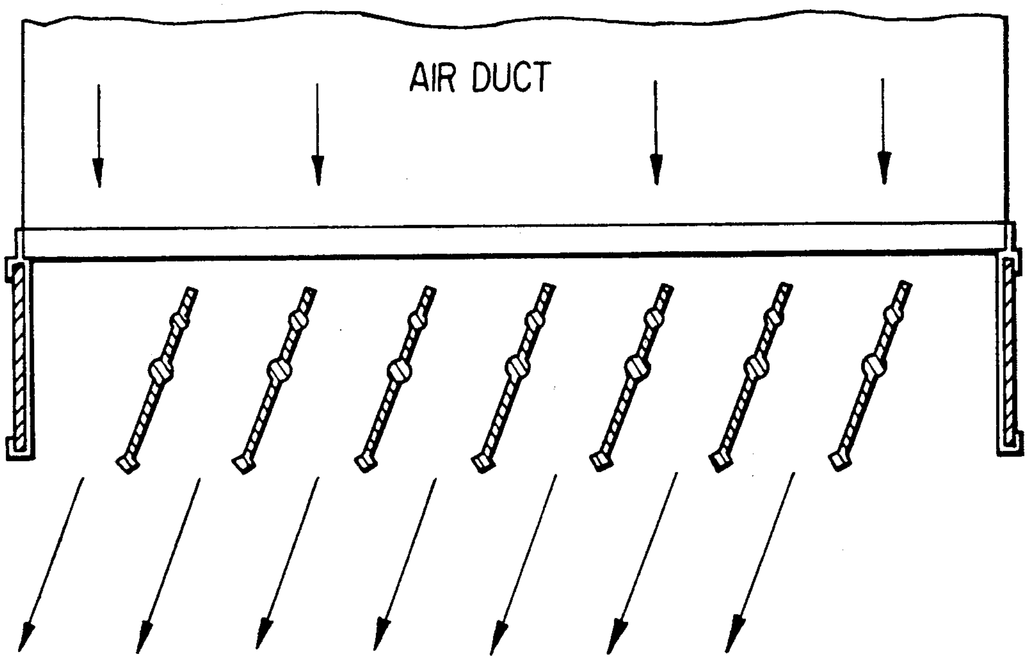
FIG. 8 PRIOR ART
FIG. 8 shows a conventional louvered damper mechanism.

Variations in the adjustment arrangement allow the damper to control the flow rate across the opening between neighboring laminar dampers so that the flow can be precisely adjusted to the user's requirements, as illustrated in FIGS. 5A and 5B. This feature has not been possible with prior art dampers.

Figure 9:
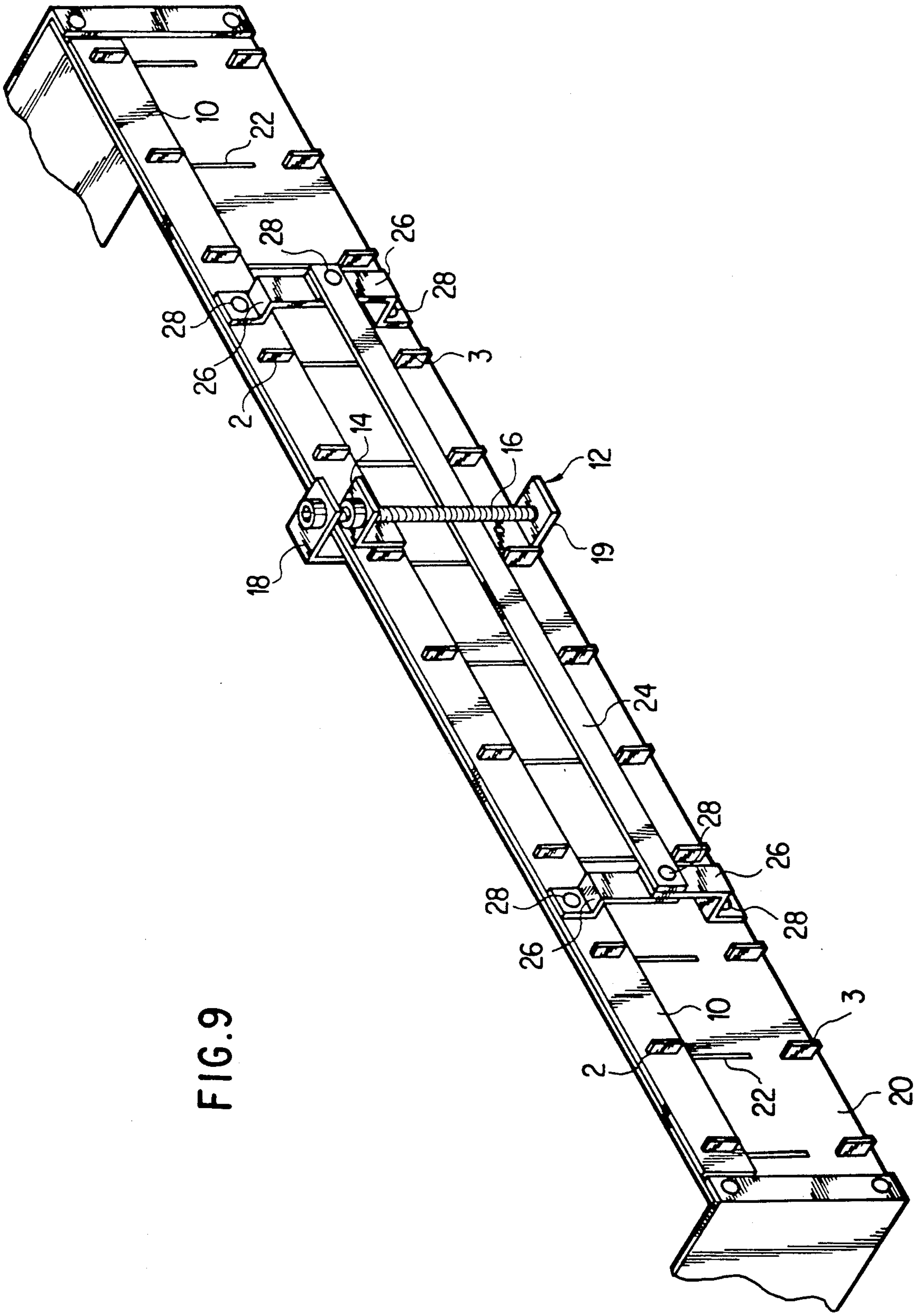
FIG. 9 illustrates the damper operating control mechanism of the present invention.
Figure 10A:
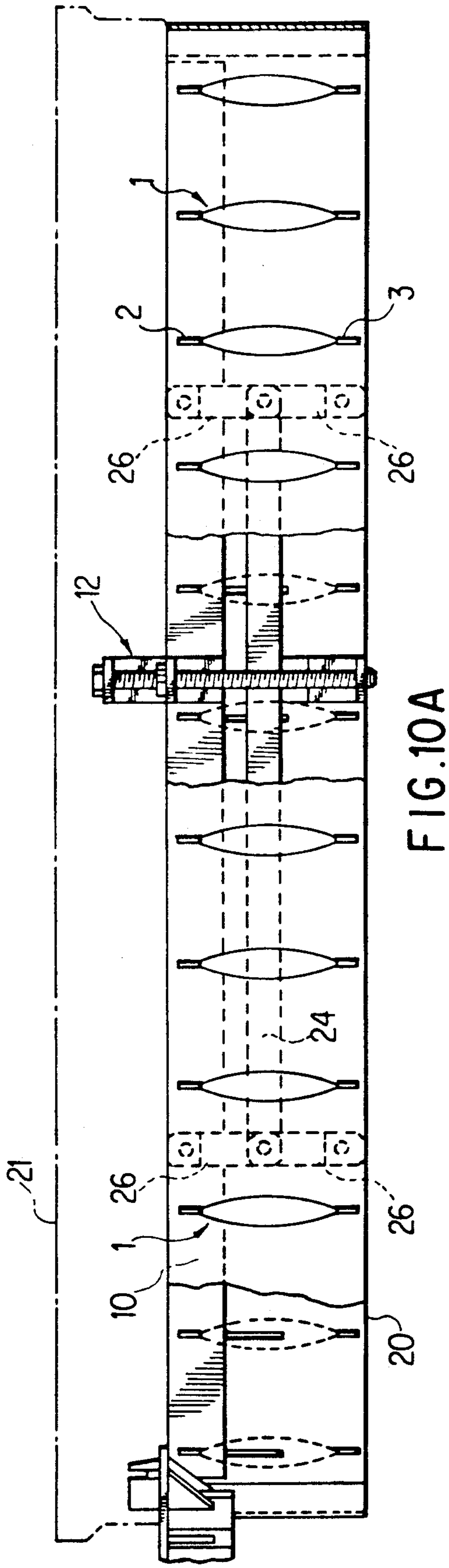
FIGS. 10A and 10B illustrate the damper operating control mechanism positioned when the flexible elements are in their maximum open and maximum closed positions, respectively.
Figure 10B:
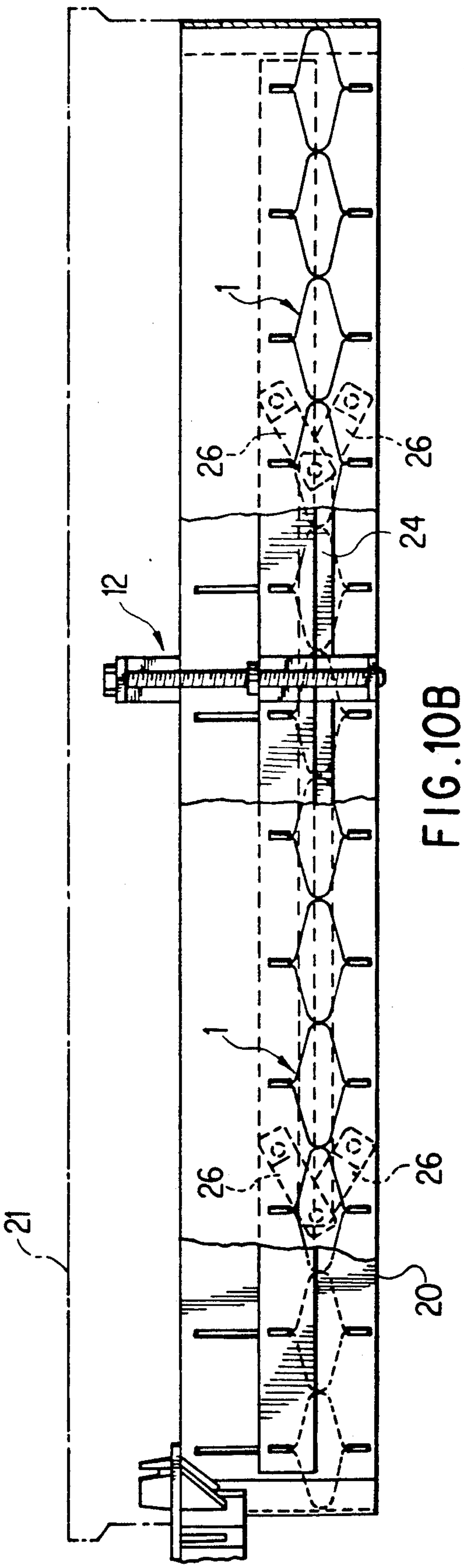

The damper operating mechanism of the present invention, which can be utilized with access floor panels, is illustrated in FIGS. 9, 10A and 10B. In FIG. 9, for ease of illustration, only the end portions of the splines have been shown. In this embodiment, end portions of the splines 2, 3 which cooperate with the flexible elements are connected to a guide member 10. Guide member 10 is in the form of a bar shaped element which is movable up and down by a control or adjustment mechanism 12 which includes a first tab 14 connected to the guide member 10, tab 14 having a threaded portion through which a threaded screw or bolt 16 cooperates. An upper portion of the screw 16 is connected to a second tab 18 which is connected to a rigid side portion of the frame 20. A similar adjustment mechanism would, of course, be provided on the opposite side of the frame 20. Frame 20 is, in turn, connected to floor panel 21. A third tab 19 is located at the bottom of the side portion of the frame and has an opening so that the end portion of the screw can freely rotate therein for the purpose of allowing moving the first tab 14 up and down with respect to the side of the frame 20 and thereby move the guide bar 10 up and down. This simultaneously permits the end portions of the upper splines 2 to move up and down within respective vertically oriented parallel openings 22 formed in the side of the frame 20. Respective lower splines 3 located on the lower portion of the flexible elements are fixed in additional openings provided in a lower portion of the side of the frame 20 as illustrated. For further securing the guide bar 10 to the side portion of the frame and allowing it to move up and down, a parallel tie bar 24 is pivotably mounted on the side portion of the frame by pivoting legs 26 which pivot about pivot points 28, as illustrated in FIG. 9 and in the closed position shown in FIG. 10B, where the guide bar 10 is moved to a lowered position. As can be appreciated from a review of FIG. 10B, when the upper splines are moved to their lowermost position, maximum flexing of the flexible elements 4, 5 is caused so that their side portions can touch or engage corresponding flexible elements of neighboring laminar dampers 1.

Figure 11A:
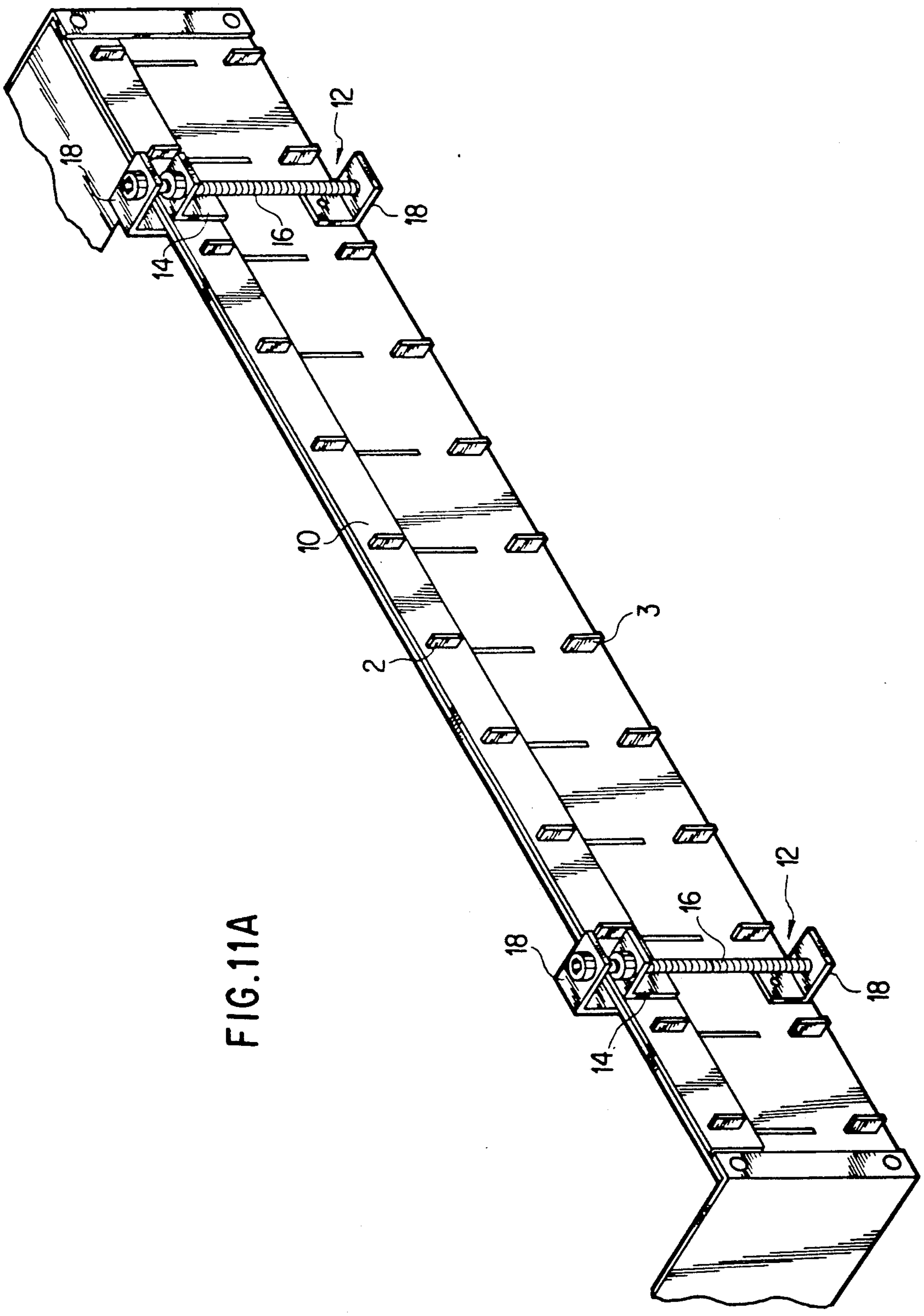
FIGS. 11A and 11B illustrates an alternate embodiment of the damper operating control mechanism.
Figure 11B:
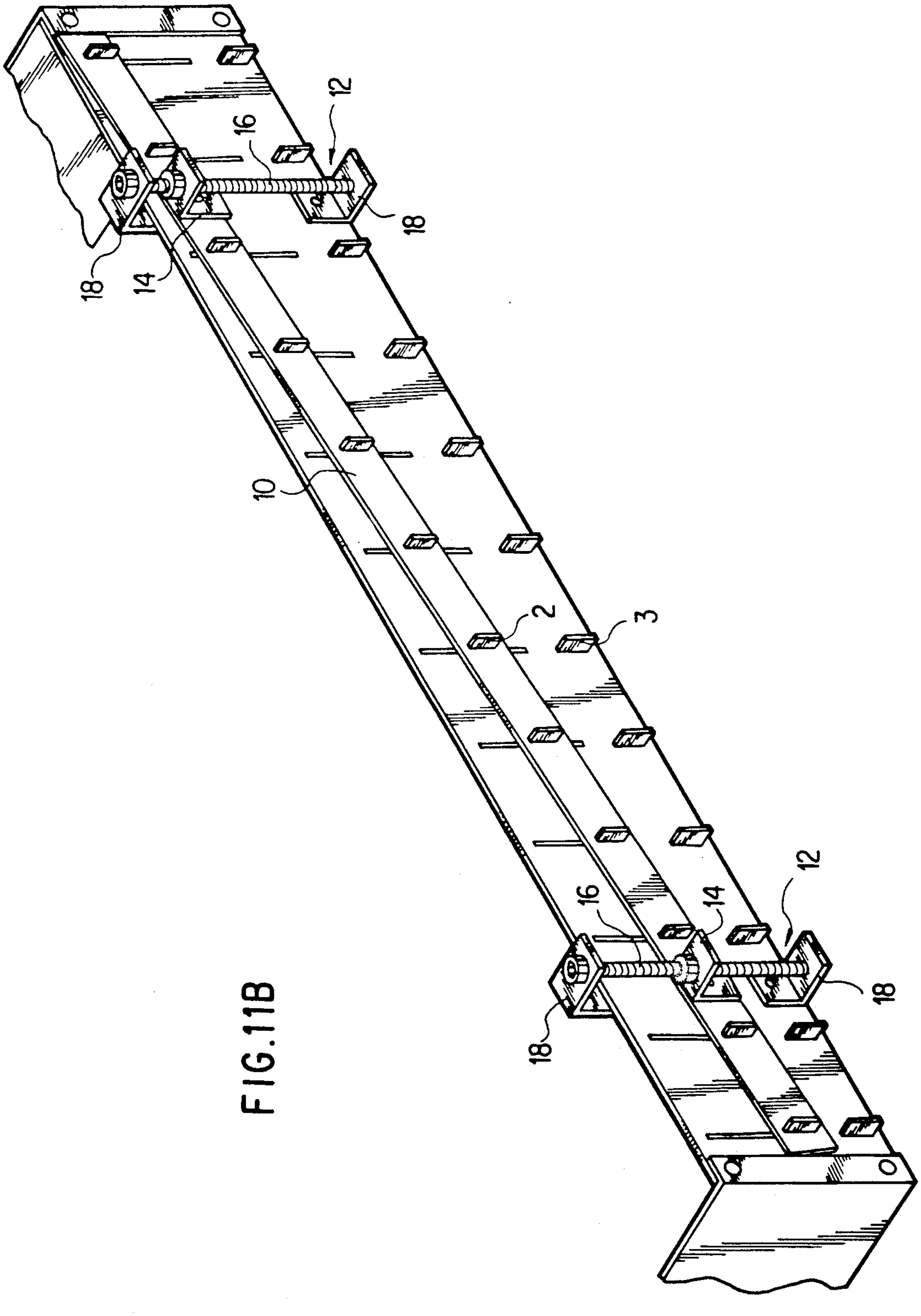

As previously mentioned, variations in the adjustment arrangement allow the damper to control the flow rate across the opening so that the flow can be adjusted to the user's requirements and therefore, the openings between neighboring flexible elements 4, 5 can be adjusted from one side of the frame to the other as illustrated in FIG. 5A, so as to have the flow profile as shown in FIG. 5B. This is possible by a variety of means, including the mechanism illustrated in FIGS. 11A and 11B. This shows that an adjustment mechanism 12 is provided near opposite ends of guide bar 10 so as to allow for air flow control similar in nature to that shown in FIGS. 5A and 5B by movement of end portions of guide number 1 in an upper or lower position. A corresponding pair of adjustment mechanisms 12 and guide members are provided on the opposite side of the frame 20.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A laminar damper for flow control of a fluid, which comprises:
   - a frame having first and second opposite sides;
   - a plurality of hollow flexible tubular shaped elements having first and second flexible sheets and positioned so as to extend between said first and second sides of said frame wherein said flexible sheets comprise uninterrupted single sheets of flexible material extending between opposite lateral edges of said hollow tubular shaped elements; and means mounted on at least said first side of said frame for compressing opposite lateral ends of said first and second sheets of each of said flexible elements towards and away from one another so as to flex said first and second sheets of each of said flexible elements towards and away from each other and for adjusting fluid flow spacings between neighboring flexible elements wherein said means for compressing said opposite lateral ends of said first and second sheets includes a pair of spline members respectively connected to said opposite lateral ends of the flexible elements of each of said flexible tubular shaped elements.

2. The laminar damper as claimed in claim 1, wherein said first side of said frame has a plurality of apertures formed therein within which end portions of said control spline members are mounted.

3. A laminar damper as claimed in claim 1, wherein said first and second sides of said frame have apertures formed therein within which said spline members are movable.

4. A laminar damper as claimed in claim 1, wherein said means for compressing the ends of the sheets comprises means for simultaneously compressing the opposite lateral edges of each of the flexible tubular shaped elements.

5. A laminar damper as claimed in claim 1, which comprises a guide member movably mounted on said at least first side of said frame and contacting each of said control spline members.

6. A laminar damper as claimed in claim 1, which comprises a guide member movably mounted on said first and second sides of said frame and contacting said control spline members for adjusting flexing of said tubular shaped elements towards and away from one another.

7. A laminar damper as claimed in claim 1, wherein said means for compressing the lateral ends of the flexible elements comprises means for varying compressing of the ends such that the degree of opening between neighboring tubular shaped elements is variable.

8. A method for controlling the flow of a fluid through a frame having first and second sides, a plurality of substantially parallel flexible uninterrupted sheets forming hollow tubular elements having first and second parallel splines fixed thereto along opposite lateral edges of the flexible sheets, which comprises:

flowing the fluid between neighboring hollow tubular elements; and biasing said first and second splines of the hollow tubular elements towards one another so as to flex said uninterrupted sheets of the hollow tubular elements away from one another and towards the neighboring hollow tubular elements as to adjustably obstruct openings formed between the neighboring hollow tubular elements and to adjust the flow of the fluid through the openings.

9. A method of controlling the flow of a fluid as claimed in claim 8, which comprises mounting opposite longitudinal end portions of said splines to said frame and moving at least one of said end portions with respect to the frame.

10. A method of controlling the flow of a fluid as claimed in claim 9, which comprises simultaneously moving said opposite lateral edges of said flexible sheets towards and away from one another.

11. A method of controlling the flow of a fluid as claimed in claim 10, which comprises selectively moving said opposite lateral edges of said flexible sheets towards and away from one another so as to variably adjust the amount of fluid flowing between the neighboring tubular elements.

* * * * *